(12) United States Patent
Kody et al.

(10) Patent No.: US 6,680,114 B2
(45) Date of Patent: Jan. 20, 2004

(54) FIBROUS FILMS AND ARTICLES FROM MICROLAYER SUBSTRATES

(75) Inventors: Robert S. Kody, Minneapolis, MN (US); Mario A. Perez, Burnsville, MN (US); Andrew T. Ruff, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 78 days.

(21) Appl. No.: 09/858,253

(22) Filed: May 15, 2001

(65) Prior Publication Data

US 2003/0031837 A1 Feb. 13, 2003

(51) Int. Cl.$^7$ .................................................. D02G 3/00
(52) U.S. Cl. ........................ 428/359; 428/399; 428/397; 428/370
(58) Field of Search ................................ 428/397, 399, 428/370, 359, 195

(56) References Cited

U.S. PATENT DOCUMENTS

| | | |
|---|---|---|
| 3,416,714 A | 12/1968 | Skinner |
| 3,470,594 A | 10/1969 | Kim |
| 3,470,685 A | 10/1969 | Hall et al. |
| 3,473,206 A | 10/1969 | Boultinghouse |
| 3,490,663 A | 1/1970 | Skinner |

(List continued on next page.)

FOREIGN PATENT DOCUMENTS

| | | |
|---|---|---|
| DE | 19840991 A1 | 3/2000 |
| EP | 0 027 273 | 4/1981 |
| EP | 0 026 581 | 5/1983 |
| EP | 0 164 235 | 12/1985 |
| EP | 0 806 512 A1 | 11/1997 |
| GB | 1073741 | 6/1967 |
| GB | 1157695 | 7/1969 |
| GB | 1171543 | 11/1969 |
| GB | 1234782 | 6/1971 |
| GB | 1267298 | 3/1972 |
| GB | 1541681 | 3/1979 |
| GB | 2 034 243 A | 6/1980 |
| GB | 2 061 281 B | 5/1981 |
| GB | 1605004 | 12/1981 |
| JP | 51033152 | 9/1976 |
| JP | 4-194068 | 7/1992 |
| JP | 02 672188 | 11/1997 |
| JP | 2000256934 | 9/2000 |
| WO | WO 95/05501 | 2/1995 |
| WO | WO 97/49326 | 12/1997 |
| WO | WO 99/06622 | 2/1999 |
| WO | WO 99/32544 | 7/1999 |
| WO | WO 99/36466 | 7/1999 |
| WO | WO 99/47573 | 9/1999 |
| WO | WO 99/60053 | 11/1999 |
| WO | WO 99/61520 | 12/1999 |
| WO | WO 00/00520 | 1/2000 |
| WO | WO 00/46435 | 8/2000 |
| WO | WO 00/68301 | 11/2000 |

OTHER PUBLICATIONS

Bigg, "Mechanical Property Enhancement of Semicrystalline Polymers", *Polymer Engineering and Science*, vol. 28, No. 13, pp. 830–841, Jul. 1988.

(List continued on next page.)

*Primary Examiner*—Merrick Dixon
(74) *Attorney, Agent, or Firm*—Kent S. Kokko

(57) ABSTRACT

Described are microfiber articles and methods and intermediates for their production, the microfiber articles being preferably produced from co-extruded microlayer films, and the articles having a microlayer construction that allows selection of the different layers to have different properties such that the article can have a desired combination of properties.

29 Claims, 2 Drawing Sheets

10μm

U.S. PATENT DOCUMENTS

| | | |
|---|---|---|
| 3,500,626 A | 3/1970 | Sandiford |
| 3,549,470 A | 12/1970 | Greenwald et al. |
| 3,565,985 A | 2/1971 | Schrenk et al. |
| 3,576,931 A | 4/1971 | Chopra et al. |
| 3,695,025 A | 10/1972 | Gibbon |
| 3,719,540 A | 3/1973 | Hall |
| 3,773,608 A | 11/1973 | Yoshimura et al. |
| 3,893,957 A | 7/1975 | Mixon et al. |
| 3,969,472 A | 7/1976 | Driscoll |
| 4,134,951 A | 1/1979 | Dow et al. |
| 4,150,184 A | 4/1979 | Tesch |
| 4,229,394 A * | 10/1980 | Rasmussen |
| 4,264,672 A | 4/1981 | Taylor-Brown et al. |
| RE30,782 E | 10/1981 | van Turnhout |
| 4,330,499 A | 5/1982 | von und zu Aufsess et al. |
| 4,348,350 A | 9/1982 | Meier et al. |
| 4,377,616 A | 3/1983 | Ashcraft et al. |
| RE31,285 E | 6/1983 | van Turnhout et al. |
| 4,425,402 A | 1/1984 | Camprincoli |
| 4,456,648 A | 6/1984 | Adamse et al. |
| 4,486,366 A | 12/1984 | Reddy |
| 4,524,101 A | 6/1985 | Eickman et al. |
| 4,588,537 A | 5/1986 | Klaase et al. |
| RE32,171 E | 6/1986 | van Turnhout |
| 4,595,738 A | 6/1986 | Hufnagel et al. |
| 4,626,263 A | 12/1986 | Inoue et al. |
| 4,652,282 A | 3/1987 | Ohmori et al. |
| 4,701,369 A | 10/1987 | Duncan |
| 4,714,716 A | 12/1987 | Park |
| 4,789,504 A | 12/1988 | Ohmori et al. |
| 4,853,602 A | 8/1989 | Hommes et al. |
| 4,867,937 A | 9/1989 | Li et al. |
| 4,916,198 A | 4/1990 | Scheve et al. |
| 4,921,652 A | 5/1990 | Tsuji et al. |
| 4,929,029 A | 5/1990 | Deziel et al. |
| 4,940,736 A | 7/1990 | Alteepping et al. |
| 4,973,517 A | 11/1990 | Lammers et al. |
| 4,990,401 A | 2/1991 | Renalls |
| 5,015,676 A | 5/1991 | Macholdt et al. |
| 5,021,473 A | 6/1991 | Macholdt et al. |
| 5,032,460 A | 7/1991 | Kantner et al. |
| 5,043,197 A | 8/1991 | Renalls |
| 5,049,347 A | 9/1991 | Magill et al. |
| 5,051,225 A | 9/1991 | Hommes et al. |
| 5,057,710 A | 10/1991 | Nishiura et al. |
| 5,069,994 A | 12/1991 | Gitzel et al. |
| 5,072,493 A | 12/1991 | Hommes et al. |
| 5,112,677 A | 5/1992 | Tani et al. |
| 5,147,748 A | 9/1992 | Gitzel et al. |
| 5,160,674 A | 11/1992 | Colton et al. |
| 5,171,815 A | 12/1992 | Magill et al. |
| 5,176,833 A | 1/1993 | Vaughn et al. |
| 5,258,220 A | 11/1993 | Joseph |
| 5,269,995 A | 12/1993 | Ramanathan et al. |
| 5,387,388 A | 2/1995 | Van Erden et al. |
| 5,389,324 A | 2/1995 | Lewis et al. |
| 5,427,842 A | 6/1995 | Bland et al. |
| 5,429,856 A | 7/1995 | Krueger et al. |
| 5,472,481 A | 12/1995 | Jones et al. |
| 5,496,507 A | 3/1996 | Angadjivand et al. |
| 5,525,287 A | 6/1996 | Van Erden et al. |
| 5,554,722 A | 9/1996 | Eichenauer et al. |
| 5,558,809 A | 9/1996 | Groh et al. |
| 5,589,122 A | 12/1996 | Leonard et al. |
| 5,599,602 A | 2/1997 | Leonard et al. |
| 5,605,936 A | 2/1997 | DeNicola, Jr. et al. |
| 5,660,922 A | 8/1997 | Herridge et al. |
| 5,695,709 A | 12/1997 | Van Erden et al. |
| 5,698,489 A | 12/1997 | Shirai et al. |
| 5,807,516 A | 9/1998 | Wolstenholme et al. |
| 5,811,493 A | 9/1998 | Kent |
| 5,845,355 A | 12/1998 | Strahm |
| 5,871,845 A | 2/1999 | Dahringer et al. |
| 5,908,598 A | 6/1999 | Rousseau et al. |
| 5,919,847 A | 7/1999 | Rousseau et al. |
| 5,945,215 A | 8/1999 | Bersted et al. |
| 5,945,221 A | 8/1999 | Tsai et al. |
| 5,968,635 A | 10/1999 | Rousseau et al. |
| 5,976,208 A | 11/1999 | Rousseau et al. |
| 5,998,308 A | 12/1999 | Cohen |
| 6,002,017 A | 12/1999 | Rousseau et al. |
| 6,013,587 A | 1/2000 | Truong et al. |
| 6,101,032 A | 8/2000 | Wortman et al. |
| 6,110,251 A | 8/2000 | Jackson et al. |
| 6,110,588 A * | 8/2000 | Perez et al. ................. 428/359 |
| 6,123,752 A | 9/2000 | Wu et al. |
| 6,124,971 A | 9/2000 | Ouderkirk et al. |

OTHER PUBLICATIONS

Davies, "The Separation of Airborne Dust and Particle", *Institution of Mechanical Engineers*, London, Proceedings 1B, 1952.

Doyle, "Strong Fabrics for Fast Sails", *Scientific American*, pp. 60–67, Jul. 1997.

Encyclopedia of Polymer Science and Technology, vol. 1, Interscience Publishers (New York, 1964).

Encyclopedia of Polymer Science and Engineering, vol. 13, Wiley–Interscience Publishers (New York, 1988).

J. Karger–Kocsis, *"Polypropylene Structure, Blends and Composites"*, vol. 1 Structure and Morphology, pp. 116–139, (1994).

J.I. Raukola, "A New Technology To Manufacture Polypropylene Foam Sheet and Biaxially Oriented Foam Film", VTT Publications 361, Technical Research Center of Finland (1998).

Jones, et al., *"Crystalline Forms of Isotactic Polypropylene"*, *Makromol. Chem.*, vol. 75, pp. 134–158 (1964).

Kolpak et al., "Deformation of Cotton and Bacterial Cellulose Microfibrils", *Textile Research Journal*, pp. 568–572, Jul. 1975.

Roger S. Porter and Li–Hui Wang, *"Uniaxial Extension and Order Development in Flexible Chain Polymers"*, *Journal of Macromolecular Science–Rev. Macromol. Chem. Phys.*, C35(1), pp. 63–115 (1995).

S. Piccarolo et al., "Crystallization of Polymer Melts Under Fast Cooling", *Journal of Applied Polymer Science*, vol. 46, 625–634, 1992.

Schrenk and Alfrey, *Polymer Blends*, vol. 2, chapter 15, "*Coextruded Multi–Layer Polymer Films And Sheets*", pp. 129–165, 1978 Academic Press.

"Survey of Polymer Morphology", pp. 149–177.

U.S.S.N. 09/602,978, filed Jun. 23,2000, "Fibrillated Article and Method of Making", pp. 1–29 (4 sheets of drawings).

U.S.S.N. 09/746,355, filed Dec. 31, 2000, "Charged Microfibers, Microfibrillated Articles and Use Thereof", pp. 1–50 (plus 3 pgs. of 6 figures).

U.S.S.N. 09/858,273, filed May 15, 2001, "Microfiber–Entangled Products and Related Methods", pp. 1–46 (plus 9 pgs. of 24 figures).

\* cited by examiner

10μm

100μm

FIBROUS FILMS AND ARTICLES FROM MICROLAYER SUBSTRATES

FIELD OF THE INVENTION

The invention relates to microlayer films microfibrillated to bear a fibrous surface, methods of preparing them, and articles made from them.

BACKGROUND

Polymeric materials that can be processed to form microfiber surfaces and microfiber articles have been identified, including mono-axially oriented films such as polypropylene. See U.S. Pat. No. 6,110,588. Such polymeric materials can be selected and processed using various techniques, to produce oriented films capable of being microfibrillated to a microfiber surface.

Microlayer films are generally known, and include a variety of different combinations of layer composition, sizes, and methods of preparing the different layers into a microlayer film, and are generally known for their specialized optical properties.

Until now, there has been no recognition of the benefits that can be achieved using co-extruded microlayer films to form microfibers, microfiber surfaces, and microfiber articles.

SUMMARY OF THE INVENTION

The invention identifies microlayer films that can be microfibrillated to bear very fine fibers, e.g., microfibers, methods of preparing the films and forming them into fiber-bearing articles, e.g., microfiber articles, and the fiber bearing articles so prepared. The films and their derivatives are referred to as microfiber-articles.

The invention specifically contemplates that certain oriented microlayer films can be fibrillated to form fibers, especially microfibers. (The descriptions herein highlight the invention with respect to "microfibrillation" and the formation of "microfibers" and "microfiber products," but the invention is not limited to the formation of microfibers or fibers of any size limitation; and one of skill will be able to understand that where the words microfibrillate, microfiber, or microfiber products are used, one could instead practice the invention to fibrillate, to form a fiber or fibrous surface, or a fiber or fibrous product.) While wishing not to be bound by theory, it is believed that interfaces between individual layers of oriented microlayer films can be sufficiently weak that the microlayer film can be fibrillated, sometimes relatively easily, to form a fibrous surface, preferably microfibers. Some films can be microfibrillated after orienting to a draw ratio of as little as about 6:1 or even 3:1. This is much lower than the ~10:1 draw ratio typically needed to microfibrillate monolayer polypropylene with fluid energy. In this same respect, it has been found that some polymer layers that heretofore could not be processed to produce microfibers can be included in uni-axially oriented microlayer films that will produce microfibers from those polymers, e.g., polystyrene. Microfibrillation of certain polymer layers of microlayer films can in some instances be realized even absent substantial molecular orientation in the microlayer film typically needed for microfiber formation. Easier fibrillation, e.g., in the form of reduced energy expenditure, can be accomplished with oriented microlayer films when compared to single layer sheets of similar draw ratio.

According to some preferred embodiments of the invention, uni-axially oriented, microlayer polymeric films can be processed into microfiber articles bearing one or more microfiber surfaces. These microfiber articles may be designed into useful products for a great variety of applications, including as mats or cloth-like materials. General advantages of the microfiber surface include that the extent of fibrillation can be controlled to enhance surface area; the surface glossiness or other optical properties of the surface can be enhanced or modified due to the presence of the microfibers; the microfiber surface of a microfiber article can be used as a reinforcing material in the manufacture of composite materials to enhance interfacial bonding; and microfiber articles can be used in microlayer constructions where the wicking effect of the microfiber surface can enhance adhesion or integrity; and, the soft nature and absorbency of the microfiber surface allows the manufacture of inexpensive wipes or adhesive bandages. In other applications, the invention can be applied to membranes, filters, or devices where materials include a fibrous or a porous surface. A separate advantage includes the possibility of easily handling small fibers in large volumes without separating them from the main web. Also, the films can have enhanced electrical chargeability or charge retention, even beyond that already retained by a fibrous highly oriented polymer. Fibrous articles can be prepared with an enhanced bulkiness due to small fiber diameters that are not self collapsing but stiff, and by selecting a high modulus starting material.

The microlayer films can be formed to a fibrous, e.g., microfiber, surface using standard methods of fibrillation, including hydroentanglement techniques using a hydroentangling machine. The depth of fibrillation of a microfiber-forming layer, or the number of layers transformed, can depend on the extent of fibrillation, which with hydroentangling processes can depend on, e.g., the amount of time that a film spends under a fluid jet of a hydroentangling machine, the intensity to which the fluid strikes the sample, the polymer properties, and to a lesser extent, the fluid and material temperature. For the microlayer films described herein, one or more of the layers maybe microfibrillated to form microfibers, and where two microfiber forming layers are adjacent to each other, microfibrillation can penetrate fully through one layer causing microfibrillation of the adjacent layer and entanglement of the microfibers of the adjacent layers. Also optionally, microfibrillation may penetrate two or more layers, e.g., adjacent layers of a microlayer film, or microfibrillation may penetrate the entire thickness of the film. By microfibrillating two or more layers of a film, microfibers can be formed from more than a single layer. Microfibers from the different layers can be present at a microfiber surface of a microfiber article, and can provide different properties if desired.

Thus, in some respects, the invention recognizes that certain processing techniques and compositions of microlayer films, especially co-extruded, mono-axially oriented microlayer films, can facilitate fibrillation or microfibrillation of polymer layers of such microlayer films, or even make microfibrillation possible for polymeric layers that cannot otherwise be microfibrillated.

In some other respects, the invention takes advantage of the understanding that films having multiple different layers with independently selected properties can be formed into a microlayer film and then microfibrillated to efficiently produce a microfiber article having a desired combination of properties based on the composition and properties of the different layers of the film. Thus, different layers of a microlayer film can advantageously be selected to include one or a variety of different properties, optionally to produce a microfiber article having a combination of desired properties. For example, different layers of a microlayer film can be independently selected to provide layers that are one or more of hydrophobic; hydrophilic; oleophobic; oleophilic; dielectric; to exhibit a certain mechanical property such as rigidity, flexibility, high or low elasticity, or high or low strength; stain resistance; to give a desired frictional property such as a high or low coefficient of friction; to provide a desired color or color combination; to provide a desired size of microfibers or a desired surface area of a microfiber surface; or combinations thereof.

As a particular example, one layer can be selected to be a hydrophilic material, to provide hydrophilic microfibers, while another layer may be oleophilic. As a different example, a fiber mat could be produced with both PP and PET fibers in one step. The PP fibers would be good for insulation, while the stiffer PET fibers could provide loft to the fiber mat. In this same manner, other layers of microlayer films can be selected to have layers of various properties which when microfibrillated can produce various multi-surface articles such as pads, drapes, cloth-like wipes, microfiber mats, and a large variety of others, which contain two or more different types of materials, optionally with two or more different types of microfibers.

Also, microlayers of a microlayer film can be selected to include one or more microfiber-forming layer and one or more layer that is not a microfiber-forming layer, e.g., to give a combination of properties from the different layers, or to form fibers that are larger than microfibers. The non-microfiber-forming layer can be selected to give a certain property, such as hydrophobicity, hydrophilicity, breathability, etc., for its stain or water resistance, or a mechanical property such as support, rigidity, flexibility, strength, or elasticity. As an example, a co-extruded microlayer film can have an inner layer of a plastic, a fluoropolymer, a flexible or soft rubber, an elastomer, etc. The microfiber article may exhibit a combination of properties including properties of a waterproof elastomer and properties of microfiber surfaces, to give an article having combined properties of a flexible or stretchable microfiber-surface-bearing cloth. As another example, a durable and strong non-microfibrillating layer can make it easier to handle a microfiber film in the form of a web, eliminating the need for a separate supporting web.

The invention allows fibrillating one or two surfaces of a co-extruded microlayer film. A patterned microfiber surface is also possible.

An aspect of the invention relates to an oriented microlayer film, microfibrillated to produce microfibers.

Another aspect of the invention relates to a co-extruded, uni-axially oriented microlayer film that can be microfibrillated to produce microfibers.

Another aspect of the invention relates to a microfiber article comprising a co-extruded, uni-axially oriented microlayer film comprising microfibers.

Another aspect of the invention relates to a method of producing a microfiber article. The method includes co-extruding a microlayer film comprising at least one layer that can be oriented into a microfiber-forming layer, orienting the at least one layer into a microfiber-forming layer, and microfibrillating the microfiber-forming layer to form microfibers.

Yet another aspect of the invention relates to an oriented microlayer film, fibrillated to produce fibers from at least one layer of the microlayer film.

Yet another aspect of the invention relates to an oriented microlayer film, fibrillated to produce a fibrous surface.

Yet another aspect of the invention relates to a method of producing a fibrous article. The method includes co-extruding a microlayer film comprising at least one layer that can be oriented into a fiber-forming layer, orienting the at least one layer into a fiber-forming layer, and fibrillating the fiber-forming layer to form fibers.

DETAILED DESCRIPTION

Figure 1:
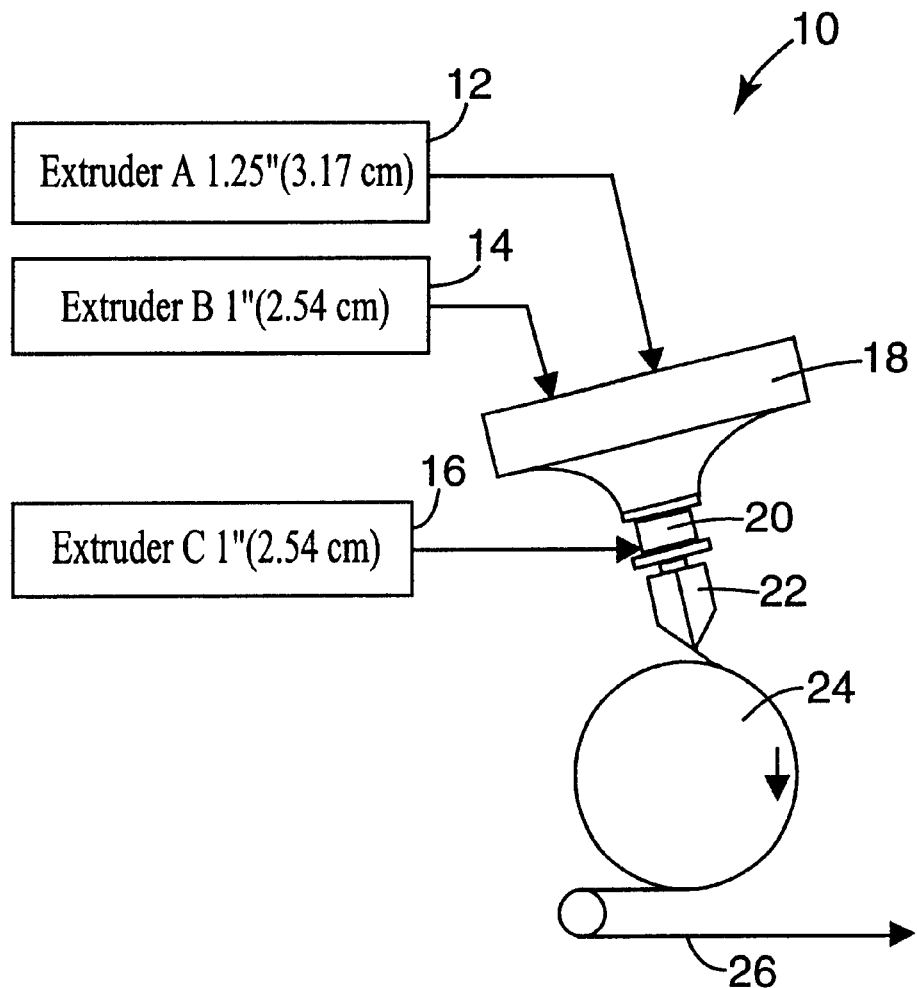
FIG. 1 illustrates a melt train for casting microlayer webs or sheets.

Microfiber articles according to the invention are prepared by microfibrillating microlayer films.

Microlayer films are multi-layer composite films, generally prepared from thermoplastic polymeric materials, and are known in the arts of polymeric films typically for their optical properties. In microlayer films, the number of different types of film layers, based on the different materials that make up the film layers, is substantially less than the total number of layers in the film, e.g., less than 25 percent, meaning as an example that if there are 1,000 layers there will be fewer than 250 different types of materials; normally the number will be significantly lower, e.g., below 10 different types of materials. More preferably, the number of different types of film layers compared to the total number of layers can be less than 10 percent or less than 5 percent, such as with a film that contains 1,000 or more layers prepared from ten or five or fewer different polymeric materials. See U.S. Pat. No. 3,565,985, the entirety of which is incorporated herein by reference.

As compared to non-microlayer, multi-layer films, a microlayer film of a given thickness and a given number of different types of layers will have more and thinner layers than a non-microlayer multi-layer film of the same thickness and having the same number of different types of layers: e.g., 500 to 2,000 layers of 3 different materials for a microlayer film compared to fewer than 6 layers of 3 different materials for a non-microlayer, multi-layer film, where both films are of the same total thickness. Examples of microlayer film constructions and methods for preparing microlayer films (and some explanation of their uses and principles of their operation) are described, for example, in the following United States Patents, the entirety of each of which is incorporated herein by reference: U.S. Pat. Nos. 5,269,995, 6,124,971, and 6,101,032.

Constructions of microlayer films are generally understood. Microlayer films useful in the present invention, while being the same as or similar in construction to other microlayer films such as those used for their optical properties, are prepared with the idea of forming microfibers from the film, as opposed to providing films with select optical properties.

Microlayer films can contain any number of a great variety of polymeric materials co-extruded to form a stack of multiple layers of (preferably a large or very large number of) one or two or more different polymers, having very small, preferably extremely small thicknesses.

The thickness of the total film and the individual layers of a microlayer film can be any thicknesses that will allow microfibrillation of at least one layer of the microlayer film. The thickness of individual layers or of a total film may have practical limitations based on processing considerations, such as the total maximum number of layers that can be cast during a co-extrusion process, the minimum thickness of such layers, and the total thickness of a coextruded film that can be either cast or further processed, e.g., calendered. Some films can have a cast (upon extrusion) thickness of no greater than about 400 mils (1016 microns), with individual layers having a minimum thickness of about 0.02 microns. To increase layer count or total thickness of a film for use in the invention, multiple microlayer films can be laminated together to form a combined microlayer film.

Overall, a microlayer film can include almost any number, e.g., tens, hundreds, thousands, or tens of thousands of layers of the same, similar, or any number of different polymeric materials. Reasons for choosing a polymer as part of a layer or film can depend on various factors, relating especially to the desired properties of different layers of the stack (e.g., hydrophobicity, oleophobicity, mechanical properties, etc.); how those properties relate to other layers of a stack or other layers of a co-extruded microlayer microfiber-forming film, e.g., with respect to inter-layer adhesion or with respect to the properties of a surface that comprises a combination of microfibers from the different films; and the ability of different types of materials to form microfibers; among other factors. For instance, different layers of two or many more different polymeric materials can be included in a single microlayer film to obtain a microlayer film that can be fibrillated to produce microfibers from any number of the different layers having different polymeric compositions, producing multiple types of microfibers and resulting in a combination of different properties in a single microfiber article.

The microlayer film can contain as many different polymeric materials as there are layers in the film. (Polymeric material refers to all types of polymeric materials, including homopolymers, copolymers, either alone or in combination as any mixture, optionally including non-polymeric materials.) The polymeric materials of the layers of a microlayer film can be chosen to be any desired material that is processable into a microlayer film, preferably that can be co-extruded as a layer of a microlayer film, and can be chosen either as a material that can produce microfibers or one that cannot produce microfibers. For ease of manufacture, or other reasons, microlayer films that contain any number of different layers, e.g., from about 500 up to 1,000, 2,000, or 5,000, may preferably contain only a few different polymeric materials, e.g., 1, 2, 5, or 10 different polymeric materials.

Optionally, different materials can be chosen and included in different layers of a microlayer film to provide the different layers, and therefore a microfiber surface or a microfiber article, with different properties. Among possible different properties that can be independently achieved in a microfibrillated microlayer film, based on the selection of materials of the different layers, are: attraction to or repulsion from different chemical materials such water and oil, e.g., layers that are hydrophobic, hydrophilic, oleophobic, oleophilic, etc.; electrically conductive or insulative properties such as a dielectric layer or an electrically conductive layer; inertness or stain resistance such as by inclusion of a fluoropolymer layer; desired mechanical properties such as a frictional property (high or low coefficient of friction, especially a low coefficient for wiping), high or low elasticity, high or low modulus, etc.; desired aesthetic properties such as color; a property of allowing a particular size of fiber, fibril, or microfiber, or a desired surface area of a microfiber surface; electrostatic properties such as the ability to hold an electrostatic charge to attract dust or other relatively small particles; or combinations thereof. These separate properties can be associated with one or more different layers of a microlayer film to provide a desired combination of properties of a microfiber article, especially a surface of the microfiber article (i.e., a "microfiber surface") based on the combined properties of two or more of the different layers.

The microlayer film includes one or more layers that can be fibrillated to form fibrils or microfibers (e.g., "microfiber-forming layers"), and may optionally include one or more layers that are not capable of being fibrillated to form fibers or microfibers (e.g., "non-microfiber-forming layers"). Different properties can be associated with either a microfiber-forming layer or a non-microfiber-forming layer.

Examples of useful polymeric materials for layers of a microfiber-forming microlayer film can include such polymeric materials as semicrystalline polymers such as high and low density polyethylene, polypropylene, polyoxymethylene, poly(vinylidine fluoride), poly(methyl pentene), poly(ethylene-chlorotrifluoroethylene), poly(vinyl fluoride), poly(ethylene oxide), poly(ethylene terephthalate), polyethylene naphthalate, poly(buylene terephthalate), poly(lactic acid), nylon 6 12, nylon 6, nylon 66, polybutene, a thermotropic liquid crystal polymer, a blend of one or more of these polymers, or a copolymer of one or more the named monomers.

Depending on the makeup of the layers of the film, microfiber films may contain fibers made up of different polymeric materials. This can mean that different, individual, microfibers of a microfiber material prepared from a microlayer film may be made of different materials, e.g., originating from different layers of the microlayer film. This may also mean that a single microfiber may be made of more than one material, from a single microlayer made of a blend or mixture of polymeric materials. Preferably, the materials that make up microfibers can originate from more than one of the different layers of the microlayer film, with each layer having the same composition or a different composition.

As stated, the microlayer film may be made up of layers of the same polymeric materials or different polymeric materials. When considering layers of different polymeric materials, the invention also contemplates layers that are made of chemically the same polymeric materials but processed to have one or more of a different physical property, morphology, thickness, viscosity, molecular weight, melt temperature, or other difference, especially if the difference affects the strength of the interface between layers of the polymeric materials. Specifically, when considering specific co-extrusion methods described below, two or more input streams of a coextrusion process can contain polymeric materials that may be considered to be chemically the same or very similar, but that have been processed differently to produce one of the above-described different properties.

Materials for use in a layer that is not a microfiber-forming layer can be generally polymeric materials that are capable of being melt processed, e.g., co-extruded to form a microlayer film. The particular polymeric material chosen can be selected for various reasons such as ease of processing, cost, and in particular, based on a physical property that is desired to be imparted to the microlayer film. For instance, a non-microfiber-forming layer may be composed of a polymeric material that provides a desired mechanical property such as strength, a desired modulus, puncture resistance, breathability, and/or a property such as water resistance, stain resistance, resistance to hydroentanglement or fibrillation by water jets, etc. Thus, a non-microfiber-forming layer may act as a barrier to fibrillation, creating an internal or external layer of a microlayer film that is an end-point to fibrillation. A non-microfiber-forming layer may also be chosen to act as a tie layer between other layers of the film, based on an ability to adhere to other layers.

Examples of polymeric materials that may be included in a non-microfiber-forming layer include polystyrene, Kraton rubbers, elastomers, polycarbonate, vinyl polymers, low density polyethylene, thermoset epoxies and hydrophilic polymers, or blends such as polyproplyene with mineral oil.

Not all microlayer films may necessarily be processed to produce microfibers. According to the invention, certain microlayer films are oriented, especially uni-axially oriented, such that one or more of the layers is capable of being fibrillated to form fibers, especially microfibers. Specifically, while not all microlayer films generally, or even all oriented or uni-axially oriented microlayer films, can be microfibrillated to form microfibers, certain microlayer films have been found to be capable of forming microfibers upon microfibrillation, if first oriented, especially uni-axially.

While wishing not to be bound by theory, it is believed that interfaces between individual layers of an oriented microlayer film can be weakened during orienting by stretching so that the microlayer film can be more easily microfibrillated. Theoretically, a microlayer film can be more easily fibrillated than a non-microlayer, multi-layer film of equal total thickness and equal number of different types of film layers (but a different number of total layers) because a microlayer film has greater interfacial area and smaller distances between interfaces. This can allow fibrillation to a given size fiber or microfiber with less energy input and can allow faster processing at any given energy input rate. The reduced or controlled distance between interfaces can also allow better control of fiber size distribution, smaller fibers, and better mixing of fibers or microfibers of dissimilar materials. The effect may be described as simply facilitating fibrillation by stretching the layers of a microlayer film into very thin layers that are more easily microfibrillated.

According to a certain aspect of the invention, microfibrillation of certain polymer layers of microlayer films may advantageously be realized even absent substantial molecular orientation in the microlayer film typically needed for microfiber formation. Easier fibrillation, e.g., in the form of reduced energy expenditure, can preferably be accomplished with co-extruded and uni-axially oriented microlayer films when compared to single layer sheets of similar draw ratio. By forming the film layers into microlayers, it has even been possible to microfibrillate some polymer layers after orienting to relatively low draw ratios, e.g., ratios as low as 6:1 or 2:1. In this same respect, it has been found that some polymer layers that otherwise may not be fibrillated to produce fibers or microfibers can now be included in oriented microlayer films that will produce fibers or microfibers of those polymers, such as polystyrene.

Microlayer films can be produced using co-extrusion techniques and equipment generally known to the skilled artisan. Microlayer film structures and technology relating to the production of microlayer films is well documented and widely practiced. Examples of descriptions useful to prepare microlayer films include the following, which are incorporated herein by reference: U.S. Pat. No. 3,365,985 to Schrenk, which describes several feedblock methods for making microlayer films; Schrenk and Alfrey, *Polymer Blends* vol. 2, chapter 15, Coextruded Multi-layer Polymer Films and Sheets, 1978 Academic Press, ISBN-0-12-546802-4, describing co-extrusion; and Tokshitaka, Campbell, Hasner, *Film Processing,* 1999, ISBN 1-56990-252-6, describing multi-layer extrusion and useful equipment.

Generally, according to co-extrusion methods, multiple streams of one or a number of different melt processable materials are divided to flow through a modular feedblock, which may be further divided into substreams and re-combined into a composite stream that passes through an extrusion die to form a microlayer film, in which each very thin layer is generally parallel to the major surfaces of adjacent layers.

The methods the invention also include those techniques that produce microlayer films (and fibrillated products from the films) that have layers so thin that they may be referred to as blends. Specifically, microlayer films co-extruded using certain annular dies having rotating elements may produce layer dimensions of a few hundred angstroms. According to Schrenk, in *Polymer Blends*, the films are, in a sense, polymer blends having a layered morphology of molecular dimensions. See, Schrenk, at page 134.

Microlayer films are mostly designed to include substantially parallel, uniform, and continuous films. While such layers of microlayer films can be very useful in the microlayer films of the invention, other types of layers may also be included in the microlayer films of the invention, such as non-parallel layers, non-continuous layers such as discontinuous lamella, or fragments of layers, any of which can contribute to a film's ability to microfibrillate.

In general, the number of layers in a microlayer film can be selected to achieve desired fibrillation properties, and to achieve desired physical properties of the film. While films having more layers can also be useful, e.g., up to 50,000 or 40,000 layers or more, useful films can typically have fewer than 10,000 layers, more preferably fewer than 5,000. Optionally, for reasons of film thickness and perhaps to achieve physical properties such as flexibility, or for economy, relatively low numbers of layers may be selected from these ranges, e.g., fewer than 2,000, 1,000, or 500 layers. As a practical matter a microlayer film also may have a minimum number of layers which may be as low as 6, 10, or 20.

The thickness of layers of a microlayer film and the total thickness of a microlayer film can be any useful thicknesses that can be processed to form microfiber-forming layers, and are limited only by practicality in producing fibers or microfibers and perhaps by practical limitations of processing, such as maximum or minimum thicknesses that can be cast or calendered. Typical total thicknesses of cast films, after extrusion but prior to any post-extrusion processing such as orienting, lengthening, or calendering, can be in the range from about 5 mils to about 400 mils, e.g., from about 10 mils to about 200 mils, e.g., 20 to 100 mils, with the range from about 30 to about 65 mils sometimes being preferred. The thickness of typical layers of a film, as extruded and prior to subsequent processing such as orienting, calendering, and stretching, can be any thickness that allows orientation to a microlayer film that can be fibrillated, generally from about 0.010 microns about 10,000 microns, with typical thicknesses being approximately in the range from about 0.5 or 1 micron to about 1,000 or about 2,500 microns.

The thicknesses of the layers and of the total film will be reduced upon orienting, calendering, or lengthening. On the microfibrillated film, layer count will relate to the interfacial area between layers and layer thickness will relate to fiber or microfiber size and size distribution. Exemplary total thicknesses of oriented microlayer films can be, e.g., in the range from about 1 mil (25.4 micron) to about 100 mils (2540 micron). These films can have any number of layers, e.g., from as low as 6, 10, 100, or 500, to 1,000, 10,000 or 50,000 layers, and the thicknesses of the layers can be various, sometimes, e.g., for the layered morphology of molecular dimensions, the thickness of layers can be in the range of nanometers, e.g., less than 100 nanometers, even as low as 14 nanometers (0.014 micron) or lower. Typical thicknesses of layers of the oriented film can be in the range from about 0.010 to 10 micron, e.g., from about 0.020, 0.10, or 1.0 micron, up to about 5 or 10 micron.

The arrangement (orders and repetitions) of different layers and relative thicknesses of different layers in a microlayer film may be any that are found to be useful in producing a microfiber article. Depending on the total number of layers and the number of different polymeric materials that the layers are made of, a large variety of repeating and random arrangements could be produced. Layer arrangement may be used to place certain materials at an interior, a core, or a surface of a microlayer film, or, perhaps, to control layer stability or instability at different interfaces.

Properties that may facilitate microfibrillation of a microlayer film can be created in a film during film manufacturing to cause the film to be able to be fibrillated to form microfibers. In general, properties and combinations of properties can be produced in a polymeric film material by selecting one or more of the composition of the film including the use of additives, and processing conditions, e.g., during extrusion, and processing conditions after extrusion, possibly including individual steps or combinations of steps such as casting, quenching, annealing, calendering, orienting, solid-state drawing, roll-trusion, and the like.

Polymeric films typically comprise long molecular chains having a backbone of carbon atoms. The theoretical strength of the polymers and the facility with which the surface of a polymer film can be microfibrillated often are not realized due to random orientation and entanglement of the polymer chains. As one means to facilitate microfibrillation, polymer chains are oriented to be relatively more parallel to one another and partially disentangled. The degree of molecular orientation is generally defined by the draw ratio, which is the ratio of the final length to the original length. This orientation may be effected by a combination of techniques, including the steps of calendering and length orienting.

Microfibrillation of polymeric films or of certain polymeric layers of microlayer films can be facilitated by orientation, especially with some films, uni-axial orientation. Uni-axial orientation can mean that a film is lengthened or stretched to orient molecules in one direction to a greater degree relative to the orientation of molecules in a different direction, e.g., a film is stretched relatively more in one direction than in another. According to the invention, a microlayer film can be processed in such a manner to orient molecules in one direction relative to another direction, to disentangle molecules, and to cause layers to become thinner, all of which contribute to causing the oriented microlayer film to be capable of forming fibers or microfibers upon microfibrillation. In general, a film may be allowed to dimensionally relax in the cross-stretch direction from the natural reduction in cross-stretch (equal to the square root of the draw ratio) while being stretched along its length. Or, a film may be constrained to limit any change in a cross dimension while being lengthened. By exemplary methods, a film can be stretched in a machine direction while its width is not maintained and the film gets longer in length, thinner, and narrower in width. In another exemplary method, the width may be fully or partially held while the length is stretched.

Oriented films can be prepared by co-extruding the polymeric materials to form a film and then orienting the film by stretching at a selected temperature, optionally followed by heat-setting at a selected temperature. Alternatively, the extrusion and orientation steps may be performed simultaneously.

The pre-stretch temperature, stretch temperature, stretch rate, draw ratio, heat set temperature, heat set time, heat set relaxation, and cross-stretch relaxation can be specifically selected to yield a microlayer film having microfibrillation properties. These variables are inter-dependent. Thus, for example, a relatively low stretch rate could be used if coupled with, e.g., a relatively low stretch temperature. It will be apparent to one of ordinary skill how to select the appropriate combinations of these variables to achieve the desired microlayer film. In general, however, uni-axial draw ratios in the range from 3:1 to 30:1, more preferably 3:1 to 20:1 or 3:1 to 10:1 have been found to allow the production of microfibers with microlayer films.

Benefits have been observed with respect to layer thickness and domain size reduction after casting. During coextrusion, there can be diffusion across fluid interfaces between layers of a film resulting in localized composition variations. In extreme cases (possibly relating to very thin layers, high temperatures, long residence times, compatible polymeric materials, etc.) interdiffusion may blur or eliminate layer interfaces. This interdiffusion slows dramatically or stops once the cast-melted film is quenched. To reduce or eliminate some of these effects and provide more distinct layer-to-layer interfaces and property differences, for any given finished layer thickness, it may be preferable to cast thick layers and use a greater degree of stretching instead of casting thinner layers with relatively less stretch.

Crystallinity also affects the ability of a polymeric material film to form fibers and microfibers. A variety of semi-crystalline, crystalline, crystallizable, and highly-crystalline polymeric materials can be processed to form fibers or microfibers. Some specific examples of materials that can be used to prepare a microfiber-forming film are discussed in U.S. Pat. No. 6,110,588.

Examples of semicrystalline polymeric materials for forming microfiber-forming films can include melt processed polymeric materials having a maximized crystallinity induced in the polymeric film layer by an optimal combination of casting and subsequent processing such as calendering, annealing, stretching, and recrystallization. For polypropylene, as an example, preferred crystallinity can be above 60%, preferably above 70%, most preferably above 75%. The crystallinity may be measured by differential scanning calorimetry (DSC) and comparison with extrapolated values for 100% crystalline polymers. See, e.g., B. Wunderlich, Thermal Analysis, Academic Press, Boston, Mass., 1990.

Films also may contain spherulites to facilitate microfibrillation. See, e.g., U.S Pat. No. 6,110,588. Many semicrystalline polymers produce spherulites on crystallization, beginning with nucleation through various stages of crystal growth. Spherulites are birefringent, usually spherical structures that are generally observed by optical techniques such as polarizing optical microscopy.

The presence of "microvoids" in an oriented film can facilitate the formation of microfibers, e.g., as described U.S. Pat. No. 6,110,588. Microvoids are microscopic voids in the film, or on the surface of the film, which occur when the film is unable to conform to deformation, e.g., upon orientation. See also Roger S. Porter and Li-Hui Wang, Journal of Macromolecular Science-Rev. Macromol. Chem. Phys., C35(1), 63–115 (1995). See also Assignee's copending U.S. Pat. No. 6,110,588, entitled "Microfibers and Method of Making".

Other components, e.g., non-polymeric materials, may be mixed into a polymeric material to facilitate microfiber formation, such as void-initiating components, e.g., as described in Assignee's patent number 6,331,343, "Films having Fibrillated Surface and Method of Making," and incorporated herein by reference.

Any suitable combination of polymer film composition and processing steps and conditions may be used to impart sufficient microscopic structure, e.g., crystallinity, microvoids, spherulites, multiple layers, orientation, etc., to produce a microlayer film that will form fibers or microfibers upon fibrillation. These processing techniques and conditions may include combinations of casting, quenching, annealing, calendering, orienting, solid-state drawing, rolltrusion, and the like, all of which are well known in the art of polymeric films. Using these techniques along with the present disclosure, a skilled artisan will be able to understand how to prepare microlayer films according to the invention that can be microfibrillated to form microfibers, microfiber surfaces, and microfiber articles.

The terms "fibrillation" and "microfibrillation," as used herein, refers to methods of imparting energy to liberate fibers or microfibers from a polymeric film. Such methods are well known in the art of processing polymeric materials, and include methods of imparting a gaseous fluid using, for example, ultrasound techniques, and methods of imparting liquid fluids such as water, for example using high-pressure water jets. These methods are described generally with respect to the formation of microfibers, for example, in U.S. Pat. No. 6,110,588.

More specifically, according to the invention, a microlayer film may be fibrillated by imparting sufficient energy to the surface to release fibers or microfibers from the polymer matrix. Optionally, prior to microfibrillation, the film may be subjected to a conventional, mechanical, fibrillation step to produce macroscopic fibers from the oriented microlayer film, such as by the use of a rotating drum or roller having cutting elements such as needles or teeth in contact with the moving film. Other similar macrofibrillating treatments are known and include such mechanical actions as twisting, brushing (as with a porcupine roller), rubbing, for example with leather pads, and flexing.

The microlayer film can preferably be fibrillated by imparting sufficient fluid energy against a surface to impart a fibrillated surface, for example, by contacting at least one surface of the film with a high-pressure fluid. A fibrillated surface is one that includes fibers of layers of the microlayer film produced from contact with the fluid. Such fibers, i.e., "macrofibers," or "fibrils" are understood, with a specific type of fibers being microfibers. All such fibers, macrofibers and microfibers, are portions of the microlayer film layers that have been mechanically separated or fragmented from the continuous film, and are therefore typically relatively flat, thin, or elongate, e.g., "ribbon-shaped," with a typically rectangular cross section; the fibrils preferably remain attached to the film at one end, but may also become completely detached from the base film.

Microfibers are fibrils that typically have a rectangular cross section with a cross sectional aspect ratio (transverse width to thickness) ranging from about 1.5:1 to about 20:1, preferably from 3:1 to 9:1. Preferred microfibers can also have one or more of the following features or dimensions: an average effective diameter of from 0.01 to 10 microns, preferably of less than 5 microns; an average cross-sectional area of $0.5\mu_2$ to $3.0\ \mu^2$, preferably from about $0.7\mu^2$ to $2.1\mu^2$. Further, the sides of the rectangular shaped microfibers are not normally smooth, but have a scalloped appearance in cross section. Atomic force microscopy reveals that the microfibers can be bundles of individual or unitary fibrils, which in aggregate form the rectangular or ribbon-shaped microfibers. Thus, the surface area exceeds that which may be expected from rectangular shaped microfibers. For example, preferred microfiber surfaces may exhibit a surface area of at least 0.25 square meters per gram, as measured using an Quantachrome AUTOSORB 1-KR gas sorption instrument (available from Quantachrome Corp., Boyhton Beach, Fla.) with krypton adsorbate.

One method of microfibrillating a film surface is with fluid jets. In this process, one or more jets of a fine fluid stream impact the surface of a microlayer film, which may be supported by a screen or moving belt, thereby releasing microfibers from the polymer matrix. The degree of microfibrillation is dependent on the exposure time of the film to the fluid jet, the pressure of the fluid jet, the cross-sectional area of the fluid jet, the fluid contact angle, the polymer properties and, to a lesser extent, the fluid temperature.

Any type of liquid or gaseous fluid may be used. Liquid fluids may include water or organic solvents such as ethanol or methanol. Suitable gases such as nitrogen, air, or carbon dioxide may be used, as well as mixtures of liquids and gases. Any such fluid is preferably non-swelling (i.e., is not absorbed by the film), which would reduce the orientation and degree of crystallinity of the microfibers. Preferably the fluid is water.

The fluid temperature may be elevated, although suitable results may be obtained using ambient temperature fluids. The pressure of the fluid should be sufficient to impart some degree of fibrillation to at least a portion of the film, and suitable conditions can vary widely depending on the fluid, the nature of the polymeric material, including the temperature. Typically, the fluid is water at room temperature and at pressures of at least 3400 kPa (500 psi), although lower pressure and longer exposure times may be used. Such fluid will generally impart a minimum of 5 watts or 10 W/cm$^2$ based on calculations assuming incompressibility of the fluid, a smooth surface and no losses due to friction.

The configuration of the fluid jets, e.g., the cross-sectional shape, may be nominally round, but other shapes may be used as well. The jet or jets may comprise a slot which traverses a section or which traverses the width of the film. The jets may be stationary, while the film is conveyed relative to the jets, the jets may move relative to a stationary film, or both the film and jet may both move. For example, the film may be conveyed in the machine (longitudinal) direction by means of feed rollers while the jets move transverse to the web. Preferably, a plurality of jets is employed, while the film is conveyed through a chamber by means of rollers, while the film is supported by a screen or scrim, which allows the fluid to drain from the microfibrillated surface. The film may be microfibrillated in a single pass, or the film may be microfibrillated using multiple passes past the jets.

The jets may be configured such that all or part of the film surface is microfibrillated. Alternatively, the jets may be configured so that only selected areas of the film are microfibrillated. Certain areas of the film may also be masked, using conventional masking agents to leave selected areas free from microfibrillation. Likewise, the process may be conducted so that the microfibrillated surface penetrates only partially, or fully through the thickness of a single microfiber-forming layer of a microfiber film, or fully or partially through one or more adjacent microfiber-forming layers. If it is desired that the microfibrillation extend through the thickness of the film, conditions may be selected so that the integrity of the article is maintained and the film is not severed into individual yarns or fibers.

A hydroentangling machine, for example, can be used to microfibrillate a surface by exposing the film to the fluid jets. Alternatively, a pressure water jet, with a swirling or oscillating head, may be used, which allows manual control of the impingement of the fluid jet. Such machines are commercially available.

Fibrillation or microfibrillation may be accomplished by other methods as well, as will be understood by the skilled artisan, e.g., by immersing a microfiber-forming material in a high energy cavitating medium, e.g., and achieving cavitation by applying ultrasonic waves to the fluid. The rate of microfibrillation is dependent on the cavitation intensity. Ultrasonic systems can range from low acoustic amplitude, low energy ultrasonic cleaner baths, to focused low amplitude systems up to high amplitude, high intensity acoustic probe systems.

In the microfibrillation process, whatever type is chosen, most of the microfibers preferably stay attached to the microfiber-forming material (now the microfiber material) due to incomplete release of the microfibers from the polymeric materials.

If desired, adjuvants may be added to the polymeric materials of the microlayer film to improve microfibrillation efficiency, such as silica, calcium carbonate or micaceous materials or to impart a desired property to the microfibers, such as antistats or colorants. Further, nucleating agents may be added to control the degree of crystallinity or, when using polypropylene, to increase the proportion of b-phase polypropylene in the crystalline film. A high proportion of b-phase is believed to render the crystalline film more readily microfibrillated. B-phase nucleating agents are known and are described, for example, in Jones, et al., Makromol. Chem., vol. 75, 134–158 (1964) and J. Karger-Kocsis, Polypropylene: Structure, Blends and Composites, vol. 1, 130–131(1994). One such beta nucleating agent is N',N',-dicyclohexyl-2,6-napthalene dicarboxamide, available as NJ-Star NU-100a from New Japan Chemical Co. Chuo-ku, Osaka. Japan.

The fibrillated film can be Conned into any of a number of different useful end constructions, e.g., microfiber products prepared from the microlayer film. A couple of examples include cloths or cloth-like materials, e.g., for cleaning; tape backings; filter materials; fibrous mats; thermal and acoustical insulation; wipes, adhesive bandages, as well as others. Also, the microlayer films, as well as microfiber products made from the films, can be processed with other materials, including other microfiber forming materials and other materials that are not microfiber Conning materials. See, e.g., Assignee's co-pending U.S. patent application Ser. No. 09/858,273, entitled "Microfiber-Entangled Products and Related Methods," filed on even date herewith and incorporated herein by reference.

EXAMPLES

Example 1

Cast microlayer sheets that could be subsequently monoaxially oriented through calendering and stretching were prepared with equipment (10) configured as shown in FIG. 1. Three commercially available single screw extruders (12, 14, 16) were connected to the feedblock (18) and skinblock (20) as shown in FIG. 1. No gear pumps, melt filtration, or static mixers were used. The feedblock was a 61 layer unit. It had two input ports designated A and B and generated a 61 layer A-B-A-B . . . -B-A non-graded stack, i.e., all A layers had approximately the same thickness, all B layers had approximately the same thickness, but A and B layer thickness were not necessarily equal. This feedblock did not make protective boundary layers. That is, the outer A layers were against the walls of the compression section, and these layers were of approximately the same thickness as inner A layers. The skin block divided the input skin stream into two nominally equal flows and applied a skin layer to the top and bottom of the microlayer stack. Web was cast through a 30.5 cm wide, single layer sheet die (22) as shown in FIG. 1.

The extruder barrel temps were set to 107, 241, 268, and 274° C. on each extruder, and the feedblock, skin block, and sheet die were set to 274° C. The cast wheel (24) water temperature was set to 23.9° C. All three extruders were started with input of FINA 3652 (polypropylene resin with a melt flow index of 8, available from Fina Inc., Dallas, Tex.). Extruder A (12), fed the outside layers of the feedblock, extruder B (14), fed the inside layers of the feedblock, and extruder C (16) fed the skin block, and the bore diameters of the extruders were 3.175, 2.54, and 2.54 cm, respectively. The rpm of extruders A, B, and C were set to deliver 6.81, 6.81, and 5.54 kg/hr of resin, respectively.

The cast wheel speed was set at about 1.8 m/min. Stable flow was achieved, and a cast microlayer sheet was saved. The thickness of the individual inner layers of the cast sheet (26) was approximately 10 microns. The outer skin thickness was 70 microns. The overall cast sheet thickness was about 670 microns.

A system with two calenders in tandem was used to orient and stretch the cast microlayer sheet. One of the calenders was used as a nip and the other calender was used as the puller. The cast sheet was fed into the nip calender held at a temperature of about 135–138° C. and operating at a surface speed of 1.22 m/min. The resulting partially oriented microlayer film exiting the nip calender was fed into the second calender held at room temperature and operating at a surface speed of 4.11 m/min. The resulting oriented microlayer film exiting the second calender had a total draw ratio of approximately 12:1.

The above oriented microlayer film was subjected to the action of high pressure water jets by passing it through a hydroentangling machine (Model 2303, Honeycomb systems Inc., Bridgeport, Me.) four times. The machine was equipped with a 61 cm die with holes of 0.127 mm in diameter and 0.381 mm of pitch. The fluid was deionized water at room temperature. The line speed was 0.91 m/min. The pressure used was 13.79 MPa.

speed of the cast sheet entering the unit (0.488 m/min). Final draw ratios of resulting oriented microlayer films are shown in the table below.

The above oriented microlayer films were microfibrillated as in Example 1, but using a die with hole diameters of 0.110 mm for the water jets and passing the microlayer films through the hydroentangler six times. The degree of microfibrillation was visually evaluated. The results are shown in the Table 1 below:

TABLE 1

Visual Evaluation of Oriented Microlayer Films after Processing in Hydroentangler.

| Example | Nip Load (kg) | Draw Ratio | Visual Evaluation |
|---|---|---|---|
| C1 | 2,270 | 2.6 | No fibrillation observed. |
| 2 | 2,270 | 4.7 | No fibrillation observed. |
| 3 | 2,270 | 8.1 | Moderate surface microfibrillation. |
| C2 | 11,350 | 2.6 | No fibrillation observed. |
| 4 | 11,350 | 7.5 | No fibrillation observed. |
| 5 | 11,350 | 12.5 | Good surface microfibrillation. |
| 6 | 11,350 | 15.0 | Good surface microfibrillation. |
| 7 | 11,350 | 16.3 | Very good and deep microfibrillation. |
| 8 | 11,350 | 18.8 | Excellent microfibrillation almost all the way through the film's thickness. |

Figure 2:
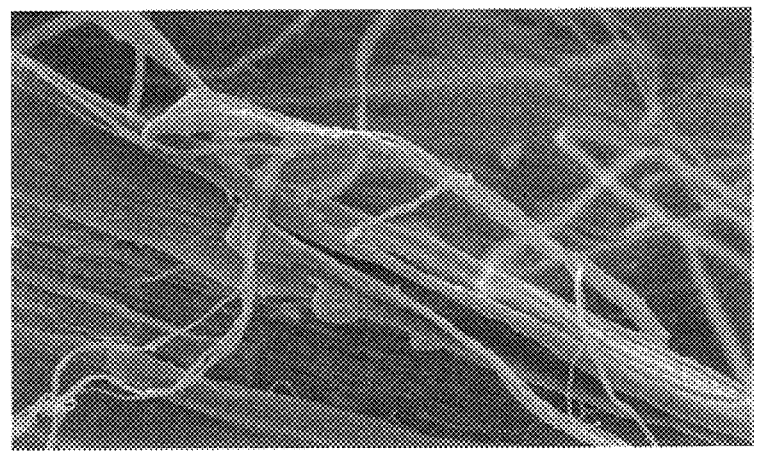
FIG. 2 is a scanning electron micrograph (SEM) of the surface of a microfibrillated oriented microlayer film.
Figure 3:
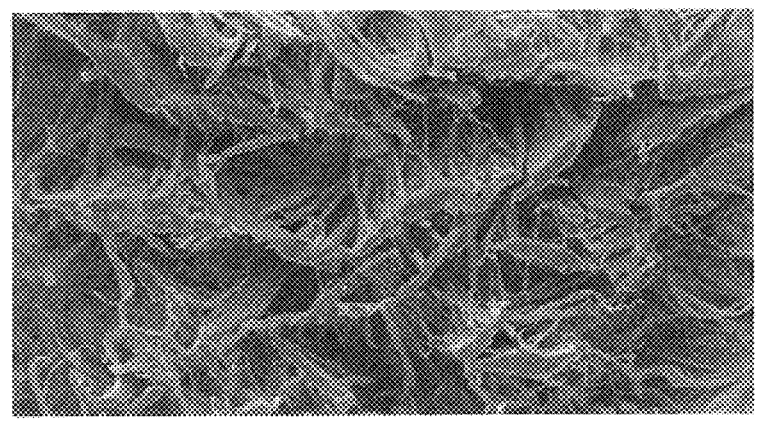
FIG. 3 is a SEM of the cross-section of a microfibrillated oriented microlayer film.

Very fine fibers were observed in the resulting microfibrillated microlayer film sample. FIG. 2 is a scanning electron micrograph (SEM) of the surface of the sample and shows the presence of microfibers. FIG. 3 is a SEM of a cross section of the microfibrillated sample and shows how the microlayered stack within the microlayer film was broken up by the action of the fluid jets to transform it into microfibers.

Example 2–8 and Comparative Examples C1–C2

This experiment describes the making of monoaxially oriented microlayer films made from pellets of Fina 3376 polypropylene thermoplastic resin and the ability to microfibrillate the films in conventional hydroentangling equipment.

A cast microlayer sheet was prepared essentially as in Example 1 using Fina 3376 polypropylene resin (polypropylene resin with a melt flow index of 2.5, available from Fina Inc., Dallas, Tex.), extruder speeds of 90–100 rpm, and the cast wheel water temperature of 82° C. The thickness of the resulting cast sheet ranged from 1.04 mm to 1.09 mm across the width of the sheet.

The above cast sheet was fed into a six roll calender/length orienting unit at a speed of 0.488 m/min. Rolls A, B, and C of the unit (held at 70, 120, and 120° C., respectively) were vertically stacked, and rolls D and E of the unit (held at 140 and 145° C., respectively) were vertically stacked immediately down-stream from the three roll stack of A, B, and C. The cast sheet first traveled around roll C, then around roll B, following an S path, and then entered the nip between rolls B and A, the nip having a gap of 0.254 mm and a load of either 2270 kg or 11,350 kg. The resulting partially oriented film, exiting the nip, traveled around rolls D and E, following an S path, and then traveled over roll F, held at 70° C. The roll speeds were varied to provide various draw ratios. The final draw ratios were calculated by dividing the speed of the oriented microlayer film exiting the unit by the The results in Table 1 above show that microlayer films with draw ratios of about 8 and above were microfibrillated. It is believed that all of the microlayer films having draw ratios of 3:1 or greater may be fibrillated with alternate processing conditions, and that microlayer films having draw ratios of 3:1 or greater and made with alternate materials and conditions may be fibrillated with the processing conditions used here.

Example 9

Example 1 was essentially repeated except that extruder B, which fed the inside layers of the feedblock, was supplied with Styron 663 (atactic polystyrene, available from Dow Chemical, Midland, Mich.), the cast wheel speed was increased to reduce delamination, the cast sheet had a thickness of 0.635 mm, and the oriented microlayer film was made to a total draw ratio of 5:1. After processing in the hydroentangler, the fibers of the resulting fully fibrillated microlayer film were found by SEM to be approximately 2–3 µm in thickness. The width of the fibers was significantly greater than the thickness (i.e., the fibers had a high width to thickness aspect ratio).

Comparative Examples C3–C5

Microlayer cast webs (approximately 0.762 mm thick) were made much the same as in Example 1, but using feedblocks that provided different numbers of layers, and supplying the extruders with different polymers. The resulting microlayer cast webs (sheets) were drawn in a tenter, producing oriented microlayer films. The resulting oriented microlayer films were then subjected to a minimum of six passes through a hydroentangler as described in Example 1. Descriptions of the microlayer webs and films are shown in Table 2. None of these bi-axially oriented microlayer films were fibrillatable.

TABLE 2

Description of Extruder Feeds for Microlayer Webs and Bi-axially Oriented Microlayer Films.

| Example | Polymer to Extruder A | Polymer to Extruder B | Polymer to Extruder C | Total Number of Layers | Layer Thickness in Oriented Film (nm) | MD Draw Ratio | TD Draw Ratio |
|---|---|---|---|---|---|---|---|
| C3 | 0.48 iv PEN | .57 iv 70/0/30 coPEN | .54 iv 55/45/HD coPEN | 892 | 90 | 1.0 | 6.0 |
| C4 | 0.48 iv PEN | cp80 pmma | 0.48 iv PEN | 446 | 90 | 3.5 | 3.5 |
| C5 | 0.59 iv PET | Engage PE–PO | 0.59 iv PET | 223 | 150 | 3.5 | 3.5 | iv = Intrinsic Viscosity determined in 60/40 weight % phenol/dichlorobenzene.
PEN = poly(ethylene/2,6-naphthalenedicarboxylate).
70/0/30 coPEN = copolymer made with 70 mol % a methyl ester of 2,6-naphthalenedicarobxylic acid and 30 mol % dimethyl isophthalate.
55/45/HD coPEN = copolymer made with 55 mol % a methyl ester of 2,6-naphthalenedicarobxylic acid and 45 mol % dimethyl terephthalate and a diol of 95 mol % ethylene glycol and 5 mol % hexane diol.
PET = polyethylene terephthalate.
ENGAGE ™ PE-PO = a polyolefin elastomer available from Dow Chemical, Midland, MI.
cp80 pmma = acrylic resin available from Ineos Acrylics, Memphis TN.

What is claimed is:

1. An oriented microlayer film, microfibrillated to produce microfibers.

2. The film of claim 1 comprising from about 6 to about 50,000 layers, each of a thickness of less than about 10 μm.

3. The film of claim 1 wherein the film comprises from about 500 to about 2,000 layers.

4. The film of claim 1 comprising from about 500 to about 2,000 layers, each having a thickness of less than about 10 μm.

5. The film of claim 1 wherein the microlayer film consists of 500 to 5,000 layers of the same polymeric material.

6. The film of claim 1 comprising 500 to 5,000 layers comprising two or more different polymeric materials.

7. The film of claim 6 wherein one or more layer comprises a semicrystalline polymer independently selected from the group consisting of high and low density polyethylene, polypropylene, polyoxymethylene, poly(vinylidine fluoride), poly(methyl pentene), poly(ethylene-chlorotrifluoroethylene), poly(vinyl fluoride), poly(ethylene oxide), poly(ethylene terephthalate), polyethylene naphthalate, poly(buylene terephthalate), poly(lactic acid), nylon 6 12, nylon 6, nylon 66, polybutene, a thermotropic liquid crystal polymer, a copolymer of one or more the named monomers, and a blend of one or more of these.

8. The film of claim 6 wherein
a layer comprises a polymer chosen from the group consisting of polypropylene, polyethylene terephthalate, polystyrene, and high density polyethylene,
and a layer comprises polypropylene.

9. The film of claim 8 wherein the two or more different polymers are arranged in a repeating fashion.

10. The film of claim 1 having from 500 up to about 5,000 layers all prepared from no more than 5 different polymeric materials.

11. The film of claim 1 having from 1,000 to 2,000 layers all prepared from no more than 4 different polymeric materials.

12. The film of claim 1 wherein the microfibers have an average effective diameter of less than 20 microns and a transverse aspect ratio of from 1.5:1 to 20:1.

13. The film claim 12 wherein the microfibers have an average effective diameter of less than 20 microns and a transverse aspect ratio of from 3:1 to 9:1.

14. The film of claim 13 wherein the microfibers have an average effective diameter of from 0.01 to 10 microns.

15. The film of claim 13 wherein the microfibers have an average effective diameter of less than 5 microns.

16. The film of claim 1 wherein the microfibers have an average cross-sectional area of $0.5\mu^2$ to $3.0\mu^2$.

17. The film of claim 1 wherein the microfibers have an average cross-sectional area of $0.7\mu^2$ to $2.1\mu^2$.

18. The film of claim 1 comprising two opposing surfaces, each surface comprising microfibers.

19. The film of claim 1 comprising
a microlayer comprising a material selected based on a property selected from the group consisting of hydrophobicity, hydrophilicity, oleophobicity, oleophilicity, a dielectric property, a frictional property, a color, stain resistance, an ability to produce a certain size of microfiber, and a combination thereof, and
a second microlayer comprising a material independently selected based on a property selected from the group consisting of hydrophobicity, hydrophilicity, oleophobicity, oleophilicity, a dielectric property, a frictional property, a color, stain resistance, an ability to produce a certain size of microfiber, and a combination thereof.

20. The film of claim 1 comprising a hydrophilic layer and an oleophilic layer.

21. The film of claim 20 comprising microfibers of the hydrophilic layer and microfibers of the oleophilic layer.

22. The film of claim 1 comprising a hydrophilic surface and an oleophilic surface.

23. The film of claim 1 comprising at least two microfiber-forming layers and further comprising a non-microfiber-forming layer.

24. The film of claim 23 wherein a layer comprises a semicrystalline polymer selected from the group consisting of high and low density polyethylene, polypropylene, polyoxymethylene, poly(vinylidine fluoride), poly(methyl pentene), poly(ethylene-chlorotrifluoroethylene), poly(vinyl fluoride), poly(ethylene oxide), poly(ethylene terephthalate), polyethylene naphthalate, poly(butylene terephthalate), poly(lactic acid), nylon 6 12, nylon 6, nylon 66, polybutene, a thermotropic liquid crystal polymer, a copolymer of one or more the named monomers, and a blend of one or more of these.

25. The film of claim 23 wherein the non-microfiber layer comprises an elastomeric polymer chosen from the group consisting of a polyethylene elastomer, a syndiotactic polypropylene elastomer, a Kraton rubber, and combinations thereof.

26. A co-extruded, uni-axially oriented microlayer film that can be microfibrillated to produce microfibers.

27. A microfiber article comprising a co-extruded, uni-axially oriented microlayer film comprising microfibers.

28. An oriented microlayer film, microfibrillated to produce fibers from at least one layer of the microlayer film.

29. The film of claim 28 wherein the microlayer film is microfibrillated by fluid energy.

* * * * *

UNITED STATES PATENT AND TRADEMARK OFFICE
CERTIFICATE OF CORRECTION

PATENT NO. : 6,680,114 B2
DATED : January 20, 2004
INVENTOR(S) : Kody, Robert S.

It is certified that error appears in the above-identified patent and that said Letters Patent is hereby corrected as shown below:

Title page,
Item [56], References Cited, OTHER PUBLICATIONS, "Davies" reference, delete "Dust and Particle" and insert in place thereof -- Dust and Particles --
"U.S.S.N. 09/602,978" reference, delete "Dec. 31, 2000" and insert in place thereof -- Dec, 21, 2000 --

Column 12,
Line 17, delete "$0.5\mu_2$" and insert in place thereof -- $0.5\mu^2$ --

Column 14,
Line 1, delete "Conned" and insert in place thereof -- formed --
Line 11, delete "Conning" and insert in place thereof -- forming --

Signed and Sealed this

Seventh Day of September, 2004

JON W. DUDAS
*Director of the United States Patent and Trademark Office*